W. C. LIPE & H. D. WEED.
ANTIFRICTION BEARING FOR AXLES.
APPLICATION FILED JAN. 4, 1915.
1,160,626.
Patented Nov. 16, 1915.
2 SHEETS—SHEET 1.
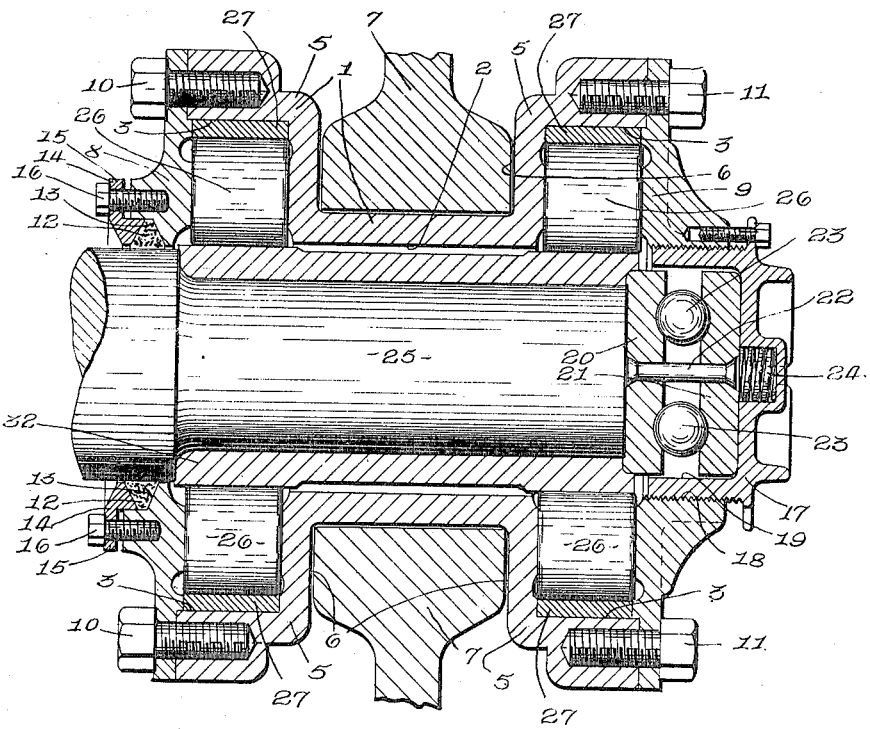
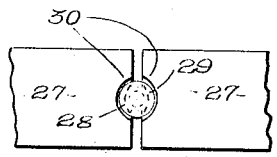
WITNESSES:
Chas H Young
Jane Frazier
Willard C. Lipe
Harry D. Weed,
INVENTORS
BY
Parsons & Powell,
ATTORNEYS W. C. LIPE & H. D. WEED.
ANTIFRICTION BEARING FOR AXLES.
APPLICATION FILED JAN. 4, 1915.

1,160,626.

Patented Nov. 16, 1915.
2 SHEETS—SHEET 2.

WITNESSES:

Willard C. Lipe
Harry D. Weed
INVENTORS.

BY
ATTORNEYS

UNITED STATES PATENT OFFICE.

WILLARD C. LIPE AND HARRY D. WEED, OF SYRACUSE, NEW YORK, ASSIGNORS TO RAILWAY ROLLER BEARING COMPANY, OF SYRACUSE, NEW YORK, A CORPORATION OF NEW YORK.

ANTIFRICTION-BEARING FOR AXLES.

1,160,626.  Specification of Letters Patent.  Patented Nov. 16, 1915.

Original application filed October 28, 1909, Serial No. 525,200. Divided and this application filed January 4, 1915. Serial No. 341.

*To all whom it may concern:*

Be it known that we, WILLARD C. LIPE and HARRY D. WEED, of Syracuse, in the county of Onondaga and State of New York, have invented a certain new and useful Antifriction-Bearing for Axles, of which the following is a specification.

This invention relates to antifriction bearings for axles, and has for its object a particularly simple and efficient journal bearing structure; and the invention consists in the novel combinations and constructions hereinafter set forth and claimed.

In describing this invention, reference is had to the accompanying drawings, in which like characters designate corresponding parts in all the views.

Figure 2:
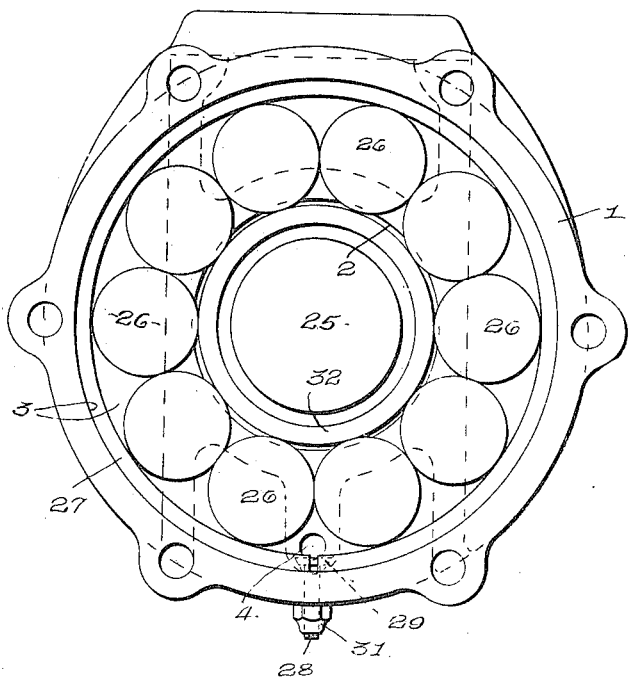
Figure 3:
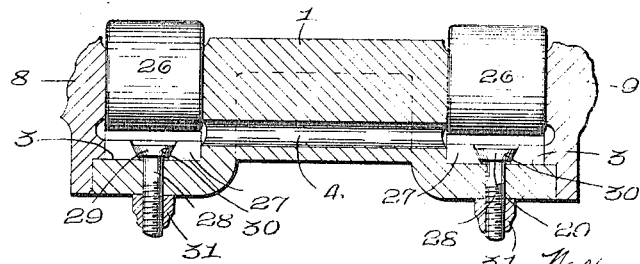

Figure 1 is a sectional view, partly in elevation, of this bearing, contiguous parts of the axle and truck frame being also shown. Fig. 2 is an end view thereof, the outer end wall being removed. Fig. 3 is a detail view of a portion of the journal box, two of the rollers being also shown. Fig. 4 is a fragmentary detail view of the opposing ends of the transversely split bearing ring and the coacting expanding member.

This bearing comprises generally a journal box having an annular raceway, the circumferential wall of which is provided with a detachable bearing ring, and means for expanding the ring to hold the same in position in the raceway. Preferably, the ring is transversely split and the means for expanding the ring acts as a wedge to separate the ends of the ring, and includes a member carried by the box substantially radially with the axis of the raceway and having a tapered head coacting with the opposing ends of the ring. We have here shown this bearing ring as embodied in an antifriction bearing for axles, such as shown in our pending application, Sr. No. 525,200, filed October 28, 1909, of which application this is a division.

1 is the journal box provided with an axle receiving opening 2 through one end wall thereof and having its opposite end closed, said opening 2 having adjacent its opposite ends concentric annular raceways 3 spaced apart from each other, and each formed with opposing flat sides or surfaces disposed at right angles to the axis of the bearing. Preferably, the raceways 3 are substantially cylindrical, are of greater diameter than the intervening portion of the axle opening and are connected by an oil passage 4 extending parallel to the axis of the opening 2 through the portion of the wall of the journal box between the bottoms of the raceways.

In the bearing here illustrated, the journal box is provided with external projecting portions 5 into which the raceways extend, and is also provided between the planes of the raceways 3 with externally arranged and vertical channels 6 confined between said projecting portions 5 and adapted to receive parts as jaws 7 of the truck frame.

Preferably, the journal box is provided with detachable end walls or disks 8, 9, respectively, secured to the main body or intermediate part of the journal box by any suitable fastening means as screws 10, 11, these end walls having their opposing faces provided with flat surfaces forming sides of the raceways, and said end walls, when removed, permitting access to the interior of the journal box. The removable end wall 8 is provided with an axle opening forming a continuation of the opening 2, and may be provided with any suitable means for preventing the entrance of dust to the interior of the journal box, as a packing ring 12 arranged in an annular channel 13 in the outer face of the end wall 8, and a clamping sleeve 14 having an annular member movable axially into said channel against the packing ring 12, the clamping sleeve being provided with a flange 15 which is clamped by screws 16 turning into the end wall 8. The outer removable end wall 9 supports means for adjusting the bearing endwise and for resisting the end thrust of the axle, said means comprising generally, a cylindrical plug 17 screwing within a central opening 18 in the end wall 9 and formed with an internal chamber 19 opening through its inner end in alinement with the opening 2, a pair of disks 20, 21, located in said chamber and rotatable independently of each other upon a pin 22 extending axially through the disks and antifriction members between the disks. The inner disk 20 projects beyond the inner end of the plug 17 in position to engage the end of the axle, and an annular series of antifriction balls 23 are arranged concentric with the pin 22 between the disks and roll in grooves in said disks. A coiled spring 24 is arranged in a pocket in the outer end of the plug 17 and bears against the disk 21 for causing the disk 20 to engage the end of the axle 25 on which the journal box is mounted.

Each raceway 3 contains a series of cylindrical rollers 26 arranged parallel to the axis of the opening 2. The portion of the bearing between the walls or disks 8, 9, that is, the intermediate part of the bearing is formed at its ends with flanges constituting the end walls of the channels 6 and the circumferential and inner side walls of the raceways 3, and the end flanges of said intermediate part are detachably secured by bolts 10, 11, to the outer portions of said walls, or disks 8, 9. The raceways are of greater diameter than the axle opening and are of greater diameter than the distance between the external channels 6 in which the jaws of the truck frame are located, as described in our pending application referred to.

27 designates the split ring located in each raceway 3 and engaging the circumferential wall thereof, and also abutting against the opposing side walls of said raceway. 28 is the expanding member having a tapered head 29 engaging opposing ends of the split ring.

As here shown, the ring is formed with a tapered perforation formed partly in each of the margins at its opposing ends, the beveled walls of the perforation converging outwardly or radially, and the expanding member 28 extends radially with the axis of the raceway, and has its tapered or beveled head located in said perforation 30. Said member 28 is here shown as a screw or bolt on the outer end of which a nut 31 turns against the outer face of the journal box, as seen in Fig. 3. The expander 28 is arranged on the lower side of the raceway so that the rollers when running over the ends of the ring are not supporting the load, and the head of the expander 28 is arranged with its upper face below the surface of the ring on which the rollers run. The rollers in the raceways preferably do not run directly upon the axle, but upon a sleeve 32 on said axle.

The ring 27 is formed of harder material than the journal box and provides a convenient and economical way for forming the raceways with hard circumferential running surfaces which can be easily removed and replaced.

What we claim is:

1. An antifriction bearing for axles comprising a journal box formed with an annular raceway, the circumferential wall of the raceway being provided with a bearing ring, means for expanding the ring to hold the same from movement in the raceway, and antifriction members in the raceway, substantially as and for the purpose described.

2. An antifriction bearing for axles comprising a journal box having an annular raceway, the circumferential wall of the raceway being provided with a bearing ring, said ring being split transversely, means for expanding the ring against the circumferential wall for holding the ring in position, and antifriction members in the raceway, substantially as and for the purpose specified.

3. An antifriction bearing for axles comprising a journal box having an annular raceway, the circumferential wall of the raceway being provided with a bearing ring, said ring being split transversely, means for separating the edges of the transverse slit of the ring for expanding the ring, and antifriction members in the raceway, substantially as and for the purpose set forth.

4. An antifriction bearing for axles comprising a journal box having an annular raceway, the circumferential wall of the raceway being provided with a bearing ring, said ring being split transversely, wedging means movable between the ends of the ring, and antifriction members in the raceway, substantially as and for the purpose described.

5. An antifriction bearing for axles comprising a journal box having an annular raceway, the circumferential wall of the raceway being provided with a bearing ring split transversely and having beveled faces converging outwardly at the ends of the ring, an expanding member having complemental beveled faces coacting with the beveled faces at the ends of the rings, and antifriction members in the raceway, substantially as and for the purpose specified.

6. An antifriction bearing for axles comprising a journal box having an annular raceway, the circumferential wall of the raceway being provided with a bearing ring, said ring being split transversely, wedging means movable between the ends of the ring, the wedging means being movable radially relatively to the axis of the raceway, and antifriction members in the raceway, substantially as and for the purpose set forth.

7. An antifriction bearing for axles comprising a journal box having an annular raceway, the circumferential wall of the raceway being provided with a bearing ring split transversely and having beveled faces converging outwardly at the ends of the ring, an expanding member having complemental beveled faces coacting with the beveled faces at the ends of the ring, the expanding member being carried by the box and extending substantially radially relatively to the axis of the raceway, and antifriction members in the raceway, substantially as and for the purpose described.

8. An antifriction bearing for axles comprising a journal box having an annular raceway, the circumferential wall of the raceway being provided with a bearing ring split transversely and having a perforation formed partly in each of the ends of the ring at opposite sides of the split, an expanding member having a tapered head extending through the perforation, and antifriction members in the raceway, substantially as and for the purpose specified.

9. An antifriction bearing for axles comprising a journal box having an annular raceway, the circumferential wall of the raceway being provided with a bearing ring split transversely and having a tapered perforation formed partly in each of the ends of the ring at opposite sides of the split, an expanding member having a tapered head extending through the perforation, the expanding member being carried by the box and arranged substantially radially with the axis of the raceway, and antifriction members in the raceway, substantially as and for the purpose set forth.

10. An antifriction bearing for axles comprising a journal box provided with an axial opening having annular raceways spaced apart from each other, the circumferential wall of each raceway being provided with a bearing ring for engaging the contiguous portion of the journal box, said ring having a transverse slit, means for separating the edges of the transverse slits of the bearing rings and forcing said rings into engagement with the contiguous portions of the journal box, and means between the planes of the raceways for engaging a truck-frame, and an annular series of rollers in each of the raceways, the rollers engaging the bearing rings, substantially as and for the purpose specified.

11. An antifriction bearing for axles comprising a journal box having detachable end walls and provided with external projecting end portions, opposing sides of said portions forming walls of external channels on opposite sides of the journal box for receiving parts of a truck-frame, said journal box being also provided with an axial opening having concentric substantially cylindrical raceways spaced apart from each other, the raceways being formed of greater diameter than the intervening portion of the axial opening and extending into said projecting portions of the journal box, the removable end walls forming sides of the raceways, the diameters of the raceways being greater than the distance between said external channels, and the circumferential wall of each raceway being provided with a bearing ring for engaging the contiguous portion of the journal box, said ring having a transverse slit, bolts carried by the journal box and having means movable between edges of the transverse slits of the bearing rings for forcing said rings into engagement with contiguous portions of the journal box, and an annular series of rollers of uniform diameter in each of the raceways, rollers of each series rolling in contact with each other and co-acting with the contiguous bearing ring, substantially as and for the purpose described.

In testimony whereof, we have hereunto signed our names in the presence of two attesting witnesses, at Syracuse, in the county of Onondaga, in the State of New York, this 29th day of December, 1914.

WILLARD C. LIPE.
HARRY D. WEED.

Witnesses:
S. DAVIS,
J. GLAZIER.

Copies of this patent may be obtained for five cents each, by addressing the "Commissioner of Patents, Washington, D. C."